Jan. 26, 1971 KENZI KATO 3,559,019
SPEED CONTROL SYSTEM OF A MOTOR AND A CIRCUIT THEREFOR
Filed April 12, 1967
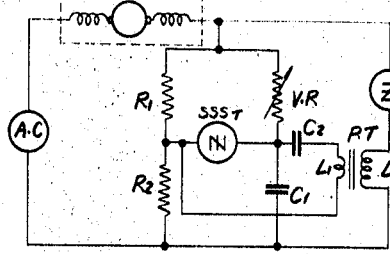
FIG_1 PRIOR ART
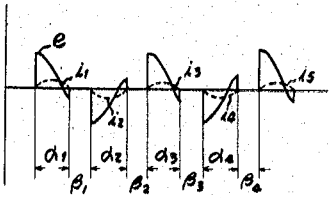
FIG_2
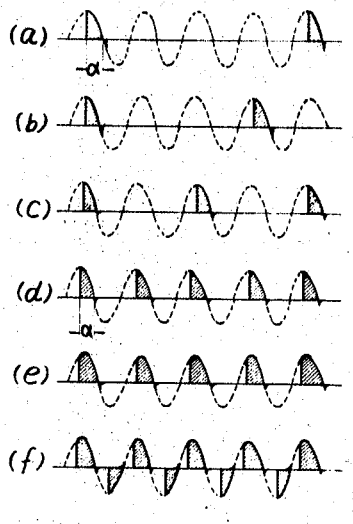
FIG_3
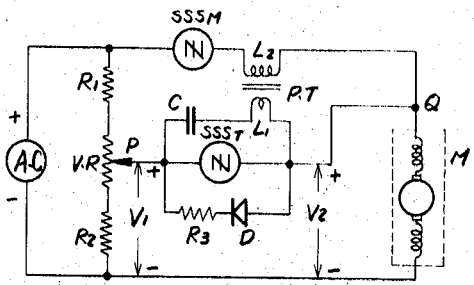
FIG_4 / FIG_5
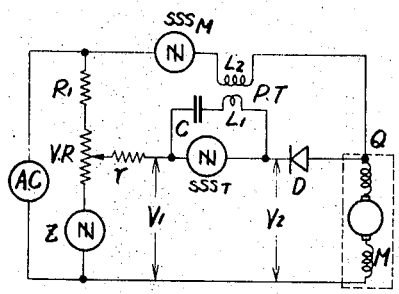
FIG_6
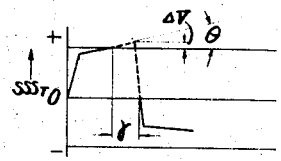
FIG_7
INVENTOR.
KENZI KATO
BY
Linton and Linton
ATTORNEYS

United States Patent Office 3,559,019
Patented Jan. 26, 1971

3,559,019
SPEED CONTROL SYSTEM OF A MOTOR AND A CIRCUIT THEREFOR
Kenzi Kato, Tokyo, Japan, assignor to Janome Sewing Machine Co., Ltd., Tokyo, Japan
Filed Apr. 12, 1967, Ser. No. 630,458
Claims priority, application Japan, Mar. 27, 1967, 42/18,606
Int. Cl. H02p 5/06
U.S. Cl. 318—331                                6 Claims

ABSTRACT OF THE DISCLOSURE

The invention relates to systems for controlling the speed of a motor and circuits therefor employing symmetrical semiconductor switching elements and more particularly to the circuits of relatively simple constitution in which the input terminal voltage of the motor is subject to a spaced wave control at the time of low speed thereof so as heighten the low speed control of a load having a fluctuating torque characteristic such as a sewing machine and the voltage is made to instantly respond to variations in the load of the motor, and the motor is automatically maintained at a set speed. For this purpose, there is provided a control circuit which is adapted to control the conduction phase of a symmetrical semiconductor switching element for a main circuit by means of a symmetrical semiconductor switching for ignition through a pulse transformer. In this control circuit, a voltage dividing circuit having a variable resistor is provided in parallel to the main circuit and an ignition circuit including the switching elements is connected between the wiper of the variable resistor, the pulse transformer and the motor so that the differential voltage between the set voltage dividing circuit and the speed starting voltage of the motor is applied to the switching element for ignition, and further a diode is connected in the forward direction to the voltage dividing circuit from between the pulse transformer and the motor so that the voltage applied to the terminals of the switching element for ignition becomes positively and negatively asymmetrical to make the switching function of the switching element perform only in one direction.

---

This invention relates to a speed control system of a motor, using a symmetrical semiconductor openable and closable element and a circuit therefor. The object of the present invention is to provide an automatic constant speed control with relatively simple construction sensitively responsive to the speed variation of motor, and, particularly to obtain a control system appropriate to speed control of a motor and a circuit therefor especially in sewing machines and other machines.

There has hitherto been provided a speed control of for motors in various kinds of machines, by using symmetrical semiconductor elements. One example of the prior speed control circuits of this kind is shown at FIG. 1 and the output wave shape of this circuit, namely the wave (e) of the voltage applied to the motor is shown at FIG. 2, the continuity phase of symmetrical semiconductor openable and closable element $SSS_M$ for the main circuit is controlled by the resistance value of variable resistor VR, thereby adjusting the breakdown phase of symmetrical semiconductor element $SSS_T$ for ignition. So in order to control the terminal voltage of the motor to the feedback responsively to the speed of the motor, it is necessary to make the breakdown phase of said semiconductor element $SSS_T$ for ignition automatically controlled by the speed of the motor. This requires a change in the resistance value of variable resistor VR responsive to the speed of the motor, or change in the amplitude of AC voltage applied to semiconductor element $SSS_T$ for ignition. However in case of relying on automatic variation of variable resistor VR, the change of the contact resistance of for example of the carbon pile, accompanied by mechanical factors such as converting variation of voltage to absorption force of the electromagnet or utilizing centrifugal force caused by variation of revolution the speed of the motor, becomes technically complicated and difficult. Moreover such mechanical mechanism requires a fairly large working power for operation and has possibility of mishap. In case of relying on variation of the voltage amplitude of the semiconductor element $SSS_T$ for ignition, the above change of contact resistance is carried out by the potential difference in phases produced according to the variable sizes of wave shape of amplitude. Since breakdown voltage of semiconductor element $SSS_T$ for ignition is in the order of about 50 v., for full control of breakdown phase of semiconductor element $SSS_T$ for ignition by amplitude, staggering of phase appears only when the wave shape of voltage is fairly widely changed so that at least a relatively large amount of feedback signal voltage is required. For obtaining such a feedback signal voltage, transformers or others are required, resulting in troublesome and high cost. As above stated, these methods of controlling feedback voltage involve technical and economical difficulties for being practically used in machines and instruments for home use such as sewing machine, not to say specially large machines.

The present invention eliminates above the drawbacks of the prior art. The fundamental object of the present invention is to perform automatic constant speed control of a motor appropriately and effectively by relatively small feedback signal voltage. Recently in sewing machine high-grade stitching operation such as zig-zag stitching, embroidery stitching is required. In order to meet with such sewing operations, a variety of devices are being made with respect to low speed control system of a sewing machine. However for making this high-grade stitching, not only low speed operation, but also continuous operation of the sewing machine at a constant revolution are required. In case of embroidery stitching, cloth feed is effected by manually moving the embroidery frame by the operator substantially at a constant speed. Here, if the running speed of the sewing machine driven by the motor varies, the operator has to make the cloth feed operation in correspondence with fluctuation of running speed. Due to the electrically driven sewing machine, this is almost impossible. This is similar in the case of zig-zag stitching as desired by the operating lever, not resorting to a cam. Further in a general stitching operation, stitching has a nature of varying in relationship with stitching speed. The variation of stitching speed causes irregular fastening of thread with shrinkage of cloth, skipped stitch, etc. all undesirable to sewing workmanship. Regarding this constant speed control, prior speed control systems become as above stated very complicated in construction and operation, and require large feedback voltage not applicable to home machines and instruments in case of either an automatically changing variable resistor or changing the voltage amplitude of the semiconductor element for ignition.

Contrary to these prior devices, the present invention comprises making positive and negative voltages applied to terminals of the semiconductor element for ignition asymmetrical and utilizing speed starting voltage of the motor produced by residue produced by the current fed to the motor, and intends to achieve thereby an appropriate automatic speed control of the motor with simple construction.

Another object of the present invention is to provide constant speed automatic control by spacing wave control and phase control. The prior control system of this kind has the disadvantage of being limited to phase control which requires a fairly high feedback signal voltage, but produces feedback of an amount relatively small to the voltage required. The constant speed automatic control according to the present invention permits spaced wave control and phase control so that a large amount of feedback can be obtained with a feeble feedback signal voltage. This constant speed automatic control can thus well cope with a small fluctuation of load.

Another object of the present invention is to provide a speed control system of a motor, a circuit therefor capable of enlarging the function especially of sewing machine. In sewing machines slow speed operation is often required for the use of the sewing machine. For intance for stitching the corner portion of a cloth piece or forming a curved stitch, it is necessary to stitch with much turning of the cloth piece. If the sewing machine is operated at high speed above the stitching, the formation of appropriate stitch becomes self-evidently impossible or difficult. Especially in case of free unique stitchgin relying on manual operation of the operator, not on a fixed cam, one has a manipulate cloth appropriately in the whole course of stitching so that the sewing machine must be driven at low speed at all times during stitching. As is well known, it is generally quite or almost impossible for prior motor driven sewing machine to have such low speed operation. For this reason embroidery stitching is generally conducted by a pedal sewing machine. As is well known by those of some experience, low speed operation can only be made with pedal sewing machines. For pedal driving of such sewing machines at a low speed, 200 r.p.m. or below, almost all the attention of the operator must be concentrated on pedalling operation, with much reduced attention directed to the embroidery stitching.

Moreover in a pedal sewing machine driven at such a low speed, the sewing machine often stops when the speed drops a little. In order to start the machine again, the operator is required to let go his hand off the embroidery stitching and give torque to the flywheel of the sewing machine for starting. So embroidery stitching made by such a sewing machine is necessarily low in efficiency and shows very awkward workmanship. So, as is well known, generally for those intending to make embroidery stitching with such a sewing machine, studies and training for a fairly long period in a special course are required, not easily accessible for housekeepers in general. As aforementioned, the present invention has much improved such as low speed operationability of such mechanism and must increased starting ability, working ability and stability of sewing machine at low speed. Accordingly, low speed work of sewing machine such as embroidery stitching can be carried out easily and simply. This much enhances the application value of the sewing machine and expands the application field thereof, eliminates the above troublesome technique of embroidery stitching, releases the operator from efforts for operating a sewing machine, thereby opening door to smooth embroidery stitching for general housekeepers too, and on the other hand permitting the operator to concentrate his attention for stitching the portion for making appropriate embroidery and others.

Another object of the present invention is to effect spacing the wave control available for realizing the above characteristic of the present invention in combination with a phase control hitherto carried out in this kind of motor. Needless to say, phase control hitherto carried out in driving a motor is preferred for driving load at high speed. Especially for the sewing machine for high-grade work, a high speed drive is essential for securing high efficiency. The present invention improves working ability in driving load at low speed and at the same time permits to make the aforementioned phase control in one construction, for full security of high speed working ability of the load. Namely the present invention advantageously increases the working ability of load in the whole range from low speed to high speed.

Another object of the present invention is to achieve the aforementioned objects with relatively simple construction. Namely the present invention utilizes the speed start voltage of the motor which is self-evidently indispensable for driving construction. Further the present invention achieves the aforementioned spacing wave control and phase control with one circuit construction, not requiring special members as control means. This proves the simpleness of construction. Moreover for controlling the input terminal voltage of the motor, the present invention adopts a symmetrical semiconductor element. This point much simplifies the construction of the present invention. By such economical construction and electric circuit, AC voltage is controlled in the manner as shown in FIG. 3(a)–(f) of the explanatory view of control operation. In FIG. 3, the dotted line represents the wave shape of AC current voltage, and the portion represented by the solid line shows that current is supplied to the motor. As seen from FIG. 3, the range of (a)–(d) all the wave shapes of voltage are not subjected to the phase control, but spaces between two waves are controlled, namely a so-called spacing wave control is made. In the range of (d)–(e) is made phase control. In the range of (e)–(f) the phase control is performed at full wave. Such a variety of automatic controls much improves the working ability of load.

Another object of the present invention is to reduce power consumption. Namely the present invention obtains torque generated of motor especially at the time of low speed drive, corresponding to the condition of generation of the torque of load of sewing machine and others. On the other hand, the present invention reduces to the possible minimum generation of unnecessarily high torque of the motor in the zone of a little torque of the sewing machine. The present invention which drives the motor in this way can evidently cut the power consumption.

Other important characteristics, effect and merits of the present invention as well as concrete construction thereof will be understood clearly and definitely with reference to the explanation of embodiments described hereinafter. In the attached drawing, FIG. 1 is an explanatory view showing an example of prior speed control circuit of a motor using symmetrical semiconductor openable closable elements.

FIG. 2 is an explanatory view of the output wave shape formed by circuit in FIG. 1.

FIG. 3 is an explanatory view of the output wave shape obtained by the present invention.

FIG. 4 is an explanatory view showing an embodiment of a control circuit according to the present invention.

FIG. 5 is an explanatory view of the ignition action of the present invention.

FIG. 6 is an explanatory view of the control circuit of another embodiment according to the present invention.

FIG. 7 is an explanatory view of operation made by the control circuit shown in FIG. 6.

To explain an embodiment of the present invention with reference to the attached drawing, FIG. 4 shows an example of an embodiment of a circuit according to the control system of the present invention. In this figure, $SSS_M$ denotes a symmetrical semiconductor openable and closable element for main circuit. $L_2$ denotes a secondary coil of ignition pulse transformer P.T. relatively to the semiconductor openable and closable element $SSS_M$ for said main circuit. M denotes a single phase series coil commutator motor. These members constitute a series closed circuit with AC power source A.C. as illustrated, to form main circuit 1. Power source A.C. portion 1' of main circuit 1 consisting of semiconductor openable and closable element $SSS_M$, secondary coil $L_2$ and motor M is connected in parallel with voltage dividing circuit 2 consisting of resistor $R_1$, variable resistor VR and and resistor $R_2$.

Between movable contact P of said variable resistor VR and terminal Q of motor M is connected the ignition circuit 3. With this ignition circuit 3 are connected pulse generating circuit 4 and asymmetrical voltage forming circuit 5 each in parallel with the symmetrical constant voltsemiconductor openable and closable element $SSS_T$ for ignition. The former is series circuit of condenser C and primary coil $L_1$ of said pulse trans P.T. The latter is the series circuit of resistor $R_3$ and diode D.

To explain the operation of the above members shown in FIG. 4, the wave shape of the terminal voltage of motor M can be controlled by the above circuit as shown in FIG. 3. In a speed control circuit using prior symmetrical semiconductor openable and closable elements, the wave shape of terminal voltage of the motor is formed by bilateral wave phase control from low voltage to high voltage as shown in the FIG. 2, whereas in circuit of the present invention, the wave shape of the terminal voltage is formed by spacing wave phase control and phase control as shown in $(a)-(f)$ of FIG. 3. To explain this spacing wave control, it is clear from the construction of FIG. 4 that when semiconductor element $SSS_M$ for the main circuit is open between both terminals of semiconductor elements $SSS_T$ for ignition a differential voltage is applied comprising the difference between voltage $V_1$ and voltage $V_2$. In this case the present invention pays atention to voltage $V_2$ at the time when semiconductor element $SSS_M$ for main circuit is open. To explain with reference to the diagram of FIG. 2, in $\beta_1$ where semiconductor elements $SSS_M$ for the main circuit is open the speed starting voltage of motor M produced by resonance which is produced by current $i_1$ in half cycle continuity $\alpha_1$ falls to $V_2$, as shown in FIG. 4. In $\beta_2$ where said semiconductor element is open, speed starting voltage produced by resonance which is produced by current $i_2$ in $\alpha_2$ falls to that $V_2$. Voltage $V_2$ at the time of open circuit $\beta_1$ and voltage $V_2$ at the time of open circuit $\beta_2$ is different in polarity as is apparent from the relation shown in FIG. 2. Further when semiconductor element $SSS_M$ for the main circuit is in open, voltage $V_1$ and voltage $V_2$ are in the relation: $V_1 > V_2$. Said speed starting voltage $V_2$ increases and decreases proportionally to speed of revolution. So in case for example the speed of revolution drops by increase of load torque and speed starting voltage reduces, voltage $V_1$ and voltage $V_2$ must be in similar polarity relations as in FIG. 4, if it is desired to raise the voltage between terminals of semiconductor element $SSS_T$ by utilizing the above drop of speed of revolution and reduction of speed starting voltage. Whereas, in the case of full wave phase control as in FIG. 2, the above polarity relations of voltage $V_1$ and voltage $V_2$ are impossible in $\beta_1$, $\beta_2$, $\beta_3$, $\beta_4$ of open circuit, unless countermeasure such as phase inverting circuit is taken. This is why the circuit of the present invention adopts half wave control by using doide D. In case that half wave control is thus adopted, if, for example, negative half wave side is made open in FIG. 2, namely the motor is not supplied with current in the periods $\alpha_2$ and $\alpha_4$, period $\beta_1-\beta_2$ becomes open circuit. So it can be said that the speed starting voltage in this period is produced by remanence which is produced by current $i_1$ at the time of closed circuit $\alpha_1$. Accordingly, in this case, the polarity relation between voltage $V_1$ and voltage $V_2$ as shown in FIG. 4 can be made in $\beta_2$ and $\beta_4$ of open circuit.

Now in case the motor stops due to no feeding of current (when voltage $V_1$ equals to the terminal voltage of semiconductor element $SSS_T$ for ignition, since voltage $V_2$ is zero), and when the maximum value of terminal voltage of semiconductor element $SSS_T$ for ignition which alternates as shown in FIG. 5(a), is made to reach breakdown voltage $V_{B01}$ of one side of semiconductor element $SSS_T$ for ignition in $T_1$ by adjusting variable resistor V.R., semiconductor element $SSS_T$ for ignition is fed with current to generate the ignition pulse. When the ignition pulse is thus generated, motor M is fed with half wave voltage having continuity angle $\alpha$ as shown in FIG. 3, and the motor rotates. Then this feeding of half wave voltage is accomplished, the motor returns to the condition of no feeding again and the terminal voltage of semiconductor element $SSS_T$ for ignition goes into the period of $T_2$ of FIG. 5(a). In this period, regardless of the fact that the maximum value of set voltage $V_1$ has reached breakdown voltage $V_{B01}$ of one side of semconductor element $SSS_T$ for ignition, the existence of speed starting voltage $V_2$ as aforementioned prevents terminal voltage of semiconductor element $SSS_T$ for ignition from reaching breakdown voltage $V_{B01}$ of said semiconductor element for ignition. Although the potential is similar in the next period $T_3$, terminal voltage of semiconductor element $SSS_T$ for ignition becomes higher than in the period of $T_2$, since the speed of revolution of the motor is lower in this period than that in period of $T_2$. Then the motor stops again at $T_4$. When voltage $V_2$ becomes zero, semiconductor element $SSS_T$ breaks down again and repeats the above phenomena.

Above mentioned is the basic principle of spacing control, and the above case relates to the case of very low speed drive and moreover intermittent rotation of rotation-stop. When contact point P of variable resistor V.R. is moved upward from the set position of above case, and voltage $V_1$ is raised as in FIG. 4, semiconductor element $SSS_T$ comes to breakdown before the amplitude of voltage applied to semiconductor element $SSS_T$ for ignition reaches maximum value. Namely in FIG. 5(b) allowance of $\Delta V$ is produced. Accordingly it comes to that notwithstanding the existence of speed starting voltage corresponding to this $\Delta V$, semiconductor element $SSS_T$ for ignition can be made to breakdown at the set point of above variable resistor. For instance, although said semiconductor element breaks down again at $T_4$ in the case of FIG. 5(a), it breaks down again at $T_3$ as shown in FIG. 5(b), so as to permit the so-called spacing wave control. Further when the speed of revolution drops due to increase of load torque and the speed starting voltage lowers below $\Delta V$, the rebreakdown is further advanced. In FIG. 5(b), the rebreakdown advances from $T_3$ to $T_2$, when all half waves not subjected to spacing wave control, come out fully so as to enable control as shown in FIG. 3(d). When the speed starting voltage further lowers, angle $\gamma$ becomes larger than that before increase of load torque, so that angle $\alpha$ of the output wave shape increases so as to enable phase control as shown in FIG. 3(e). However, the relation of phase control by angle $\alpha$ is similar to that in the prior art and the increment is quite small as compared with the embodiment of the present invention shown in FIG. 6. Inversely, when speed of revolution rises due to decrease of load torque, and speed starting voltage rises above $\Delta V$ at time $T_3$, rebreakdown delays to $T_4$. Additionally the circuit of the embodiment of the present invention in FIG. 4, which connects resistor R as illustrated, can thereby finally feed half wave of the opposite polarity too, after completion of spacing control by half wave as shown in FIG. 3(f). Namely supposing that there is no resistor $R_3$ when diode D is forward, voltage as seen on the negative side of FIG. 5 can be obtained due to the voltage drop, though voltage is not applied to semiconductor element $SSS_T$ for ignition. So, it comes to that, when voltage $V_1$ rises above a certain value, the voltage on the negative side also reaches breakdown voltage $V_{B02}$ on the opposite side of semiconductor $SSS_T$ for ignition, thereby enabling both wave controls. Accordingly the circuit of the present invention can control terminal voltage of motor in a variety of ways as seen from FIG. $3(a)-(f)$, by adjusting variable resistor V.R. and moreover can make feedback action keeping the speed of motor to the set speed in zones of FIG. $3(a)-(d)$ as a prominent characteristic of this circuit. In zone $(f)$ of the same figure, feedback caused by speed starting voltage acts in the opposite direction, because of the bilateral wave, but this is of no importance since the feedback is cancelled by inertia of the load with respect to some variation of load torque owing to the fairly high speed condition of the motor and its load.

FIG. 6 shows a modified circuit of the present invention which is markedly different from the circuit of the embodiment with respect to the present invention shown in FIG. 4 in the position of diode D and the use of voltage discharging element Z (SSS in this embodiment) in place of resistor $R_2$ in FIG. 4. Firstly, to explain the position of diode D, in FIG. 6 it is connected in series with semiconductor element $SSS_T$ for ignition and saves resistor $R_3$ in FIG. 4. In this way with respect to half wave control, as the first role of the diode, and action of changing into bilateral waves the voltage above a predetermined one as shown in FIG. 3($f$), the second role of the diode, the terminal voltage of semiconductor element $SSS_T$ for ignition can be made positively and negatively asymmetrical similarly to the diode of FIG. 4, so that this action is similar to that of FIG. 4 as to result. For this second role there is utilized the inverse resistance of the diode itself. In this case if for instance a germanium diode or selenium rectifier, is used which has a characteristic that with increase of inverse voltage said inverse resistance reduces slowly, the opposite polarity of terminal voltage of semiconductor element $SSS_T$ for ignition namely voltage of breakdown voltage $V_{B02}$ side can be conveniently controlled by adjusting voltage $V_1$. Further to explain the above constant voltage discharge element Z shown in FIG. 6, its first purpose is to prevent variation of the power source voltage from influencing voltage $V_1$. The second purpose is to obtain a wide variation of angle $\gamma$ as shown in FIG. 5 relatively to variation of speed starting voltage. Namely the wave shape of voltage applied to semiconductor element $SSS_T$ for ignition is deformed into a wave shape near rectangular wave as in FIG. 7, and angle $\theta$ made by the apex of rectangular wave with break over line is made smaller than angle $\theta$ made by sine wave shape of FIG. 5 with break over line. By this reduction of angle $\theta$, feedback due to phase angle $\alpha$ of each wave of this output wave shape considerably influences together with feedback due to space automatic control of spacing wave of the output wave so that the present invention can provide an appreciably effective phase control ability by a small voltage. In other words, by reducing this angle $\theta$ to the utmost, automatic control by phase angle $\alpha$ of output wave shape is emphasized. So when this automatic control by phase angle $\alpha$ is emphasized, the space control of the spacing wave necessarily stops and it becomes possible to control the phase angle $\alpha$ of perfect half wave as shown in FIG. 3($d$) by signal voltage of several mv., contrary to the prior art. Additionally in FIG. 6 the use of constant voltage discharge element Z does not hinder the adjustment of voltage V by variable resistor V.R. Additionally resistor $\gamma$ is protective resistance of $SSS_T$ and Z.

What we claim is:

1. In a control circuit adapted to control the conduction phase of a first symmetrical semiconductor switching element for a main circuit by means of a second symmetrical semiconductor switching element for ignition through a pulse transformer, a system for controlling the speed of a motor comprising a voltage dividing circuit having a variable resistor and connected in parallel to the main circuit, and an ignition circuit including the second switching element for ignition and connected betwee a wiper of the variable resistor and a point on the main circuit between the pulse transformer and the motor, a diode connected in the forward direction to the voltage dividing circuit from between the pulse transformer and the motor on the main circuit, so that a differential voltage between the set voltage of the voltage dividing circuit and the speed starting voltage of the motor is made asymmetrical by the diode, whereby the switching function of the switching element for ignition performs in only one direction to effect a spaced wave control of the terminal voltage of the motor.

2. A system for controlling the speed of a motor as set forth in claim 1 wherein a diode is connected in parallel to the switching element for ignition and a resistor is connected in series to the diode, thereby to provide a half-wave control as well as a bilateral wave control of the switching element.

3. A system for controlling the speed of a motor as set forth in claim 1, wherein a diode is connected in series to the switching element for ignition, the reverse resistance of the diode decreasing as the reverse voltage increases, thereby to effect a bilateral wave control of the switching element for ignition.

4. A circuit for controlling the speed of a motor comprising a main circuit having a symmetrical semiconductor switching element for the main circuit, a secondary winding of a pulse transformer and a motor connected in series to a power source, a voltage dividing circuit having a resistor and a variable resistor in series and connected in parallel with the main circuit, and an ignition circuit comprising a symmetrical semiconductor switching element for ignition, a primary winding of the pulse transformer, a condenser, a dode and a resistor and connected from the voltage divider to a point on the main circuit between the secondary winding of the pulse transformer and the motor.

5. A circuit for controlling the speed of a motor as set forth in claim 4, wherein the diode is connected in series to the switching element for ignition and a constant voltage discharging element is provided in the voltage dividing circuit.

6. A circuit for controlling the speed of a motor comprising a main circuit having a first symmetrical semiconductor switching element for the main circuit, a secondary winding of a pulse transformer and a motor connected in series to a power source, a voltage dividing circuit having a resistor and a variable resistor in series and connected in parallel with the main circuit, and an ignitition circuit comprising a second symmetrical semiconductor switching element for ignition, a primary winding of the pulse transformer, a condenser, a diode and a resistor and connected from the voltage divider to a point on the main circuit between the secondary winding of the pulse transformer and the motor, the primary winding of the pulse transformer and the condenser being connected in series to each other, the diode and the resistor being connected in series to each other, and the series circuits being respectively connected in parallel to the second switching element for ignition.

References Cited

UNITED STATES PATENTS 3,293,523  12/1966  Hutson  318—345X
3,336,517  8/1967  Cain  318—332

ORIS L. RADER, Primary Examiner

R. J. HICKEY, Assistant Examiner

U.S. Cl. X.R.

318—345